United States Patent
Parent et al.

(10) Patent No.: US 8,938,219 B2
(45) Date of Patent: Jan. 20, 2015

(54) FLOW COMPUTERS HAVING WIRELESS COMMUNICATION PROTOCOL INTERFACES AND RELATED METHODS

(75) Inventors: Jeffrey David Parent, Ames, IA (US); Richard Joseph Vanderah, Marshalltown, IA (US)

(73) Assignee: Bristol, Inc., Watertown, CT (US)

( * ) Notice: Subject to any disclaimer, the term of this patent is extended or adjusted under 35 U.S.C. 154(b) by 198 days.

(21) Appl. No.: 13/463,189

(22) Filed: May 3, 2012

(65) Prior Publication Data

US 2013/0295859 A1    Nov. 7, 2013

(51) Int. Cl.
*H04M 3/42* (2006.01)
*H04L 29/06* (2006.01)
*H04B 7/00* (2006.01)
*H04M 1/00* (2006.01)

(52) U.S. Cl.
USPC ............... 455/414.1; 455/414.3; 455/507; 455/557

(58) Field of Classification Search
CPC ....... H04W 84/18; H04W 84/22; H04L 67/02
USPC .......... 455/418–420, 414.1–414.3, 507, 517, 455/557; 709/223
See application file for complete search history.

(56) References Cited

U.S. PATENT DOCUMENTS

| | | | |
|---|---|---|---|
| 7,289,861 B2 * | 10/2007 | Aneweer et al. ............. 700/110 |
| 7,974,661 B1 * | 7/2011 | Righi ........................... 455/574 |
| 7,986,968 B2 * | 7/2011 | Dobrowski et al. .......... 455/557 |
| 8,203,463 B2 * | 6/2012 | Bragg et al. ............. 340/870.02 |
| 8,224,256 B2 | 7/2012 | Citrano, III et al. |
| 8,294,568 B2 * | 10/2012 | Barrett ...................... 340/539.11 |
| 2005/0164684 A1 * | 7/2005 | Chen et al. ................. 455/414.1 |
| 2007/0249386 A1 * | 10/2007 | Bennett ...................... 455/550.1 |
| 2007/0258508 A1 * | 11/2007 | Werb et al. ..................... 375/140 |
| 2008/0268784 A1 | 10/2008 | Kantzes et al. |
| 2010/0190442 A1 | 7/2010 | Citrano, III et al. |
| 2010/0290084 A1 | 11/2010 | Russell, III et al. |
| 2010/0290351 A1 | 11/2010 | Toepke et al. |
| 2010/0290359 A1 | 11/2010 | Dewey et al. |
| 2011/0085525 A1 * | 4/2011 | Patini ............................. 370/338 |
| 2011/0110242 A1 | 5/2011 | Nixon et al. |
| 2011/0164512 A1 * | 7/2011 | Citrano et al. ................ 370/252 |
| 2011/0216695 A1 * | 9/2011 | Orth .............................. 370/328 |
| 2012/0005326 A1 * | 1/2012 | Bradetich et al. ............. 709/223 |
| 2012/0035749 A1 | 2/2012 | Schleiss et al. |
| 2012/0127971 A1 | 5/2012 | Isaksson |
| 2012/0269181 A1 * | 10/2012 | Gonikberg et al. ........... 370/336 |

* cited by examiner

*Primary Examiner* — Simon Nguyen
(74) *Attorney, Agent, or Firm* — Hanley, Flight and Zimmerman, LLC

(57) ABSTRACT

Flow computers having wireless communication protocol interfaces and related methods are disclosed. In one example, a method involves receiving a request to be sent to a wireless device in a network of wireless devices, the request to be received via a remote terminal unit application executed on a processor within a flow computer, and communicating the request to the wireless device via a communications interface module, the communications interface module to be communicatively coupled to the processor via a backplane contained within a housing of the flow computer, the backplane to provide communications according to a high speed data bus communications protocol.

21 Claims, 5 Drawing Sheets

FLOW COMPUTERS HAVING WIRELESS COMMUNICATION PROTOCOL INTERFACES AND RELATED METHODS

FIELD OF THE DISCLOSURE

This disclosure relates generally to supervisory control and data acquisition systems and, more particularly, to flow computers having wireless communication protocol interfaces and related methods.

BACKGROUND

Supervisory control and data acquisition (SCADA) systems, like those used in the oil and gas production industry, frequently include a flow computer as a central piece of equipment in a production process system (e.g., at a wellhead production site). Flow computers are used to perform flow calculations, control the system, optimize the system, create historical archives, and/or communicate with the SCADA network. Monitoring and/or controlling a process system via a flow computer is made possible by interfacing the flow computer with field devices (e.g., valves, valve positioners, switches, sensors, transmitters, etc.) configured to perform control functions such as opening or closing valves and measuring process parameters. Such field devices interface with the flow computer via any of analog, digital, or combined analog/digital buses via any desired communication media (e.g., hardwired, wireless, etc.) and protocols (e.g., Fieldbus, Profibus®, HART®, etc.).

SUMMARY

Flow computers having wireless communication protocol interfaces and related methods are disclosed. In one example, a method involves receiving a request to be sent to a wireless device in a network of wireless devices, the request to be received via a remote terminal unit application executed on a processor within a flow computer, and communicating the request to the wireless device via a communications interface module, the communications interface module to be communicatively coupled to the processor via a backplane contained within a housing of the flow computer, the backplane to provide communications according to a high speed data bus communications protocol.

In another example, an apparatus includes a communications interface module to communicate with a network of one or more wireless devices according to a wireless communications protocol, a local processor to execute a remote terminal unit application, the remote terminal unit application to communicate with the devices in the network via the communications interface module, and a backplane to communicatively couple the remote terminal unit application and the communications interface module according to a high speed data bus communications protocol.

DETAILED DESCRIPTION

Flow computers are often associated with remote terminal units (RTUs), which enable a flow computer to communicate with other components within a supervisory control and data acquisition (SCADA) system, a distributed control system (DCS), or any other control system. As used herein, a SCADA system, a DCS, and a control system, all refer to any type of control system and, thus, are used interchangeably throughout this disclosure. In some known process systems, an RTU may supplant a flow computer by being programmed with the functions of a flow computer. However, as used herein, the term flow computer refers to any appropriate configuration of a flow computer and/or a RTU including a standalone flow computer with a communications component, a standalone RTU with flow computer functionality, or a combination of a flow computer and RTU (either integrated or as separate interfacing devices).

Incorporating a flow computer into a control system involves enabling the flow computer to communicate with one or more field devices. The cost and/or complexity of creating, configuring, operating, and/or maintaining an interface between field devices and a flow computer depends upon the type(s) of field devices, the corresponding type(s) of signaling (e.g., analog, digital, or combined analog/digital), the desired communication media (e.g., hardwired, wireless, etc.), and the governing protocol(s) implemented (e.g., Fieldbus, Profibus®, HART®, etc.). With all these various modes of interfacing field devices with flow computers, the resulting integration and configuration of differing components may increase the time, cost, and complexity of the process system while reducing the reliability of the system.

Figure 1:
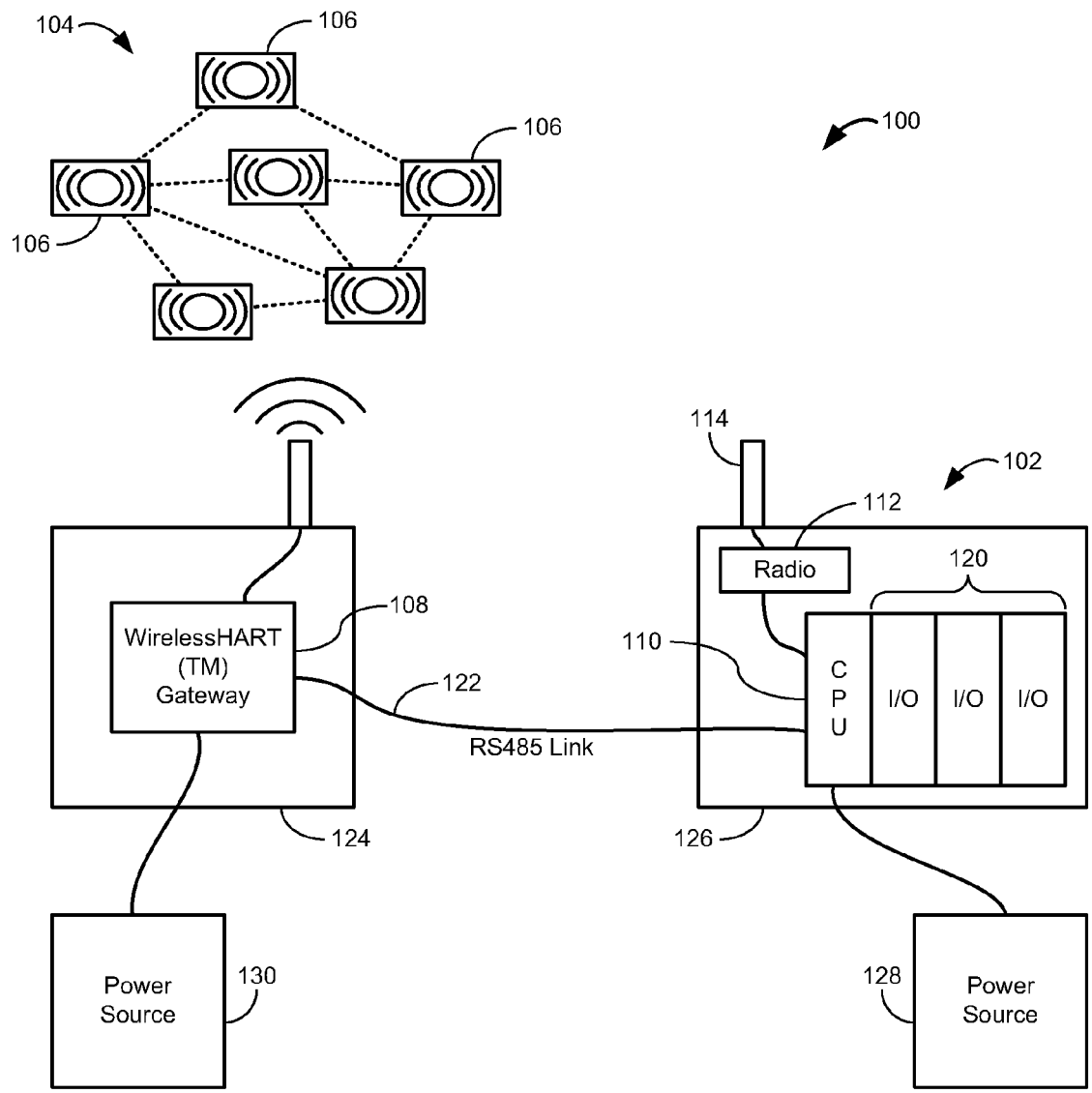
FIG. 1 illustrates a known system to enable the communication of a flow computer with a network of field devices via a WirelessHART™ Gateway.

For example, FIG. 1 illustrates a known system 100 to enable the communication of a flow computer 102 with a network 104 of field devices 106 via a WirelessHART™ Gateway 108. The field devices 106 are wireless devices that communicate wirelessly with the gateway 108 according to the WirelessHART™ protocol. The HART™ protocol is commonly used in many control systems and WirelessHART™ builds upon this protocol by enabling communications to be made wirelessly. In general, WirelessHART™ is an advanced protocol that may implement a point-to-point networking scheme between a host (e.g., the gateway 108) and one or more transmitters (e.g., the field devices 106) that overlay a loop current with digital signals. The protocol also enables advanced capabilities such as data acquisition, process control, and/or diagnostics. Furthermore, WirelessHART™ enables a network (e.g., the network 106) to be built into a mesh to allow individual devices (e.g., the field devices 106) to communicate with each other. A meshed network increases the stability of the overall system by enabling traffic to be rerouted if a particular path goes down.

In the known system 100 of FIG. 1, the flow computer 102 includes a processor 110 via which the functionality of the flow computer 102 is implemented. The processor 110 is in communication with a long haul wireless radio 112 to transmit data and other information to a SCADA system (not shown) via an antenna 114. The processor 110 may also be in communication with one or more I/O ports 120 to interface with other components within the SCADA system. However, in the known system 100 of FIG. 1, the flow computer 102 is not WirelessHART™ compliant, thereby preventing a direct connection via one of the I/O ports 120. To overcome this limitation, many known systems, such as the known system 100, implement an intermediate component, such as the gateway 108, to act as the master or host to the field devices 106 to transmit requests and receive responses from the field devices 106 in accordance with WirelessHART™. In turn, the flow computer 102 is the master of the gateway 108 that sends requests to the field devices 106 and receives the responses via the gateway 108. To interface the flow computer 102 and the gateway 108, the known system 100 implements an RS485 link or cable 122 as the physical layer to implement any suitable communications protocol between the gateway 108 and the flow computer 102 (e.g., Modbus, Ethernet, etc.).

Thus, while the wireless field devices 106 may be connected to a flow computer 102 in this manner, the known system 100 creates a number of complexities that require considerable time and expense to implement. For example, because the gateway 108 and the flow computer 102 employ different communication protocols, the RS485 link 122 must be configured separately at the gateway 108 and at the flow computer 102 using different configuration tools. Furthermore, the intermediate gateway 108 increases the complexity of the known system 100 because there is a hierarchy of two masters (the flow computer 102 is a master with respect to the gateway 108, and the gateway 108 is a master with respect to the field devices 106) rather than one master that communicates with all lower devices. Not only does this increased complexity add time and, therefore, cost to the known system 100, it also reduces the reliability of the system 100.

Another cost created by the known system 100 involves the physical footprint of the separate gateway 108 and the flow computer 102. As shown in FIG. 1, the gateway 108 is placed in a housing 124 and the flow computer 102 includes a separate housing 126. Typically, the housings 124, 126 must conform to safety standards applicable to the particular environmental conditions where the housings 124, 126 are located. For example, if the known system 100 is incorporated into an oil and gas production site, the housings 124, 126 may be NEMA 4 enclosures as defined by the National Electrical Manufacturers Association (NEMA). In the known system 100 of FIG. 1, two regulation housings 124, 126 would be required because there are two separate components (e.g., the flow computer 102 and the gateway 108) that may be separated at a distance from one another. Furthermore, including the separate gateway 108 in the known system 100 also requires additional equipment to power the gateway 108. As shown in FIG. 1, the flow computer 102 receives power from a first power source 128. While the power source 128 may be any suitable power source, a typical implementation of the known system 100 at an oil and gas production site often uses a solar power system. The first power source 128 not only powers the processor 110 of the flow computer 102 but also provides power to the I/O ports 120 and any interface modules inserted therein. However, in the known system 100, the gateway 108 must receive its own power from a second power source 130, which may also be a solar power system. As a result, the need for equipment for additional power supplies as well as the increased power consumption adds further cost to the implementation of the known system 100.

Figure 2:
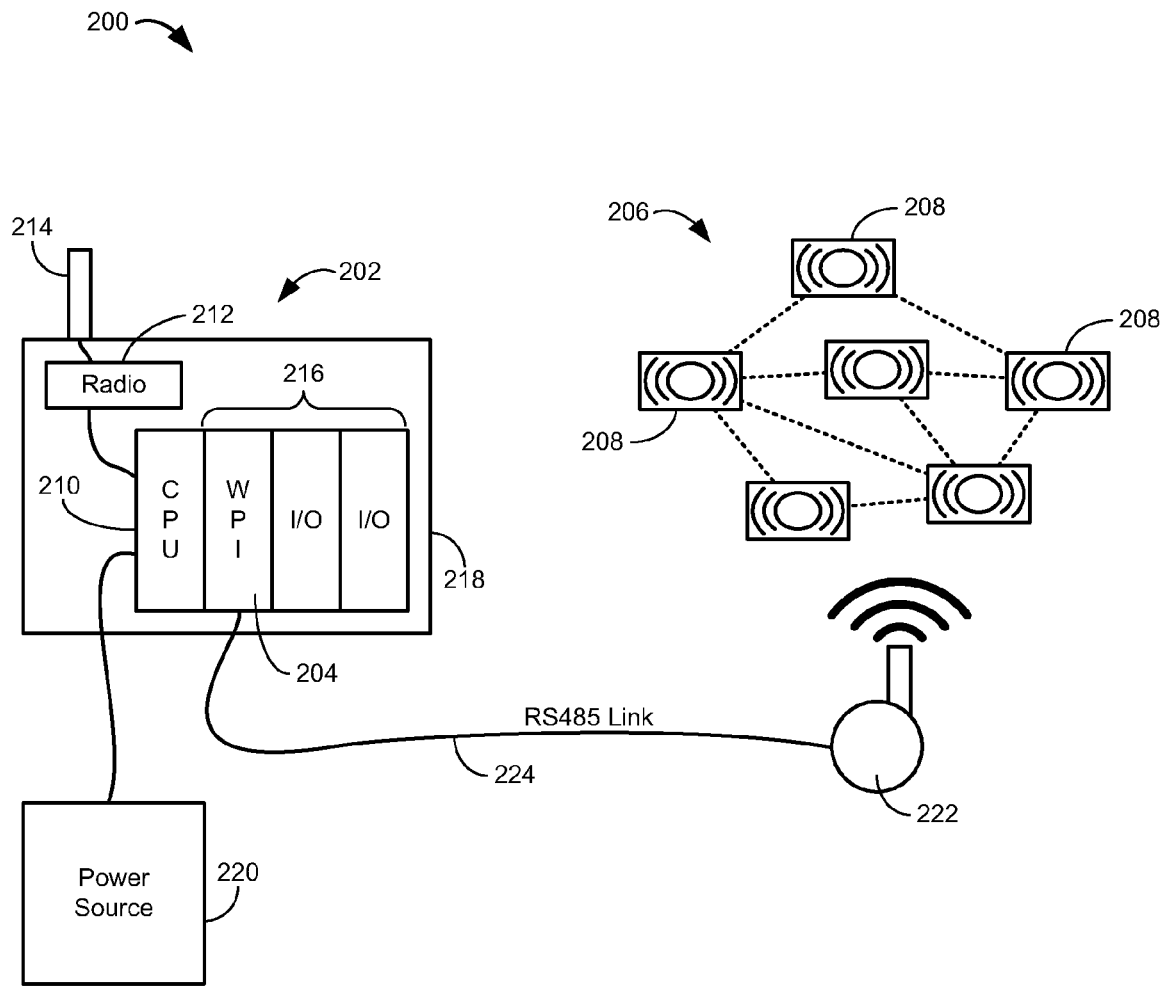
FIG. 2 illustrates an example system comprising an example flow computer having a wireless protocol interface module to communicate with the network of field devices of FIG. 1.

FIG. 2 illustrates an example system 200 comprising an example flow computer 202 having a wireless protocol interface (WPI) module 204 to communicate with a network 206 of field devices 208 of FIG. 1. In some examples, the wireless communications protocol associated with the WPI module may be WirelessHART™ such that the network 206 of field devices 208 corresponds to the network 104 of field devices 106 of FIG. 1. The example flow computer 202 includes a native or local processor 210 that contains the core functionality of the flow computer 202. The native processor 210 may be any type of processing unit, such as a processor core, a processor and/or a microcontroller. The native processor 210 is in communication with a long haul wireless radio 212 to communicate with a SCADA system via an antenna 214. The native processor 210 of the example flow computer 202 may also be in communication with one or more I/O ports 216, in one of which is coupled to the WPI module 204.

As shown in FIG. 2, the native processor 210 and the WPI module 204 are both contained within a single housing 218, thereby reducing the cost to meeting regulation safety standards as compared with the known system 100 of FIG. 1 (which requires two separate housings 124, 126). In addition to the single housing 218, the native processor 210 and the WPI module 204 are both powered by a single power source 220 which, in some examples, may be a solar power system or any other suitable power supply. As a result, the cost of equipment and power consumed is also reduced when compared with the known system 100 of FIG. 1.

With the example flow computer 202 configured as explained, the flow computer 202 may communicate with the network 206 of field devices 208 via a network radio transmitter and/or receiver 222. As used herein, the term radio refers to any of a wireless transmitter or a wireless receiver either separately or in combination. As shown in FIG. 2, the network radio 222 may be in communication with the flow computer 202 via the WPI module 204 through an RS485 link 224 used as the physical layer to implement any suitable communications protocol (e.g., HART). Unlike the known system 100 of FIG. 2, the network radio 222 and the WPI module 204 are both configured to implement the same wireless protocol. Thus, only one configuration step using only one configuration tool is needed. As will be explained more fully below in connection with FIG. 3, other communication configurations are accomplished internally within the flow computer 202. As a result, the example system 200 is greatly simplified over the known system 102 of FIG. 1 with fewer components, fewer safety rated enclosures, less power consumption, less configuration, and only one master to communicate directly with the field devices 208.

Similar to the safety standards for the housing 218 of the flow computer 202, the network radio 222 may also conform to certain environmental safety standards. For example, the network radio 222 may be a NFPA 70 class 1, division 1 compliant radio transceiver to enable placement within a hazardous area environment. Additionally or alternatively, in some examples, the network radio 222 may also be included within the flow computer 202 such that the network radio 222 resides within the housing 218 similar to the long haul wireless radio 212 to further reduce the number of safety rated enclosures used to implement the system 200. Additionally, in some examples, the network radio 222 is integrated directly into the WPI module 204 thereby further reducing the overall footprint of the example flow computer 202 and, correspondingly, the size of the safety rated housing 218. Whether the network radio 222 is within the housing 218 or external to the housing 218 may depend upon the particular application for the system 200.

Figure 3:
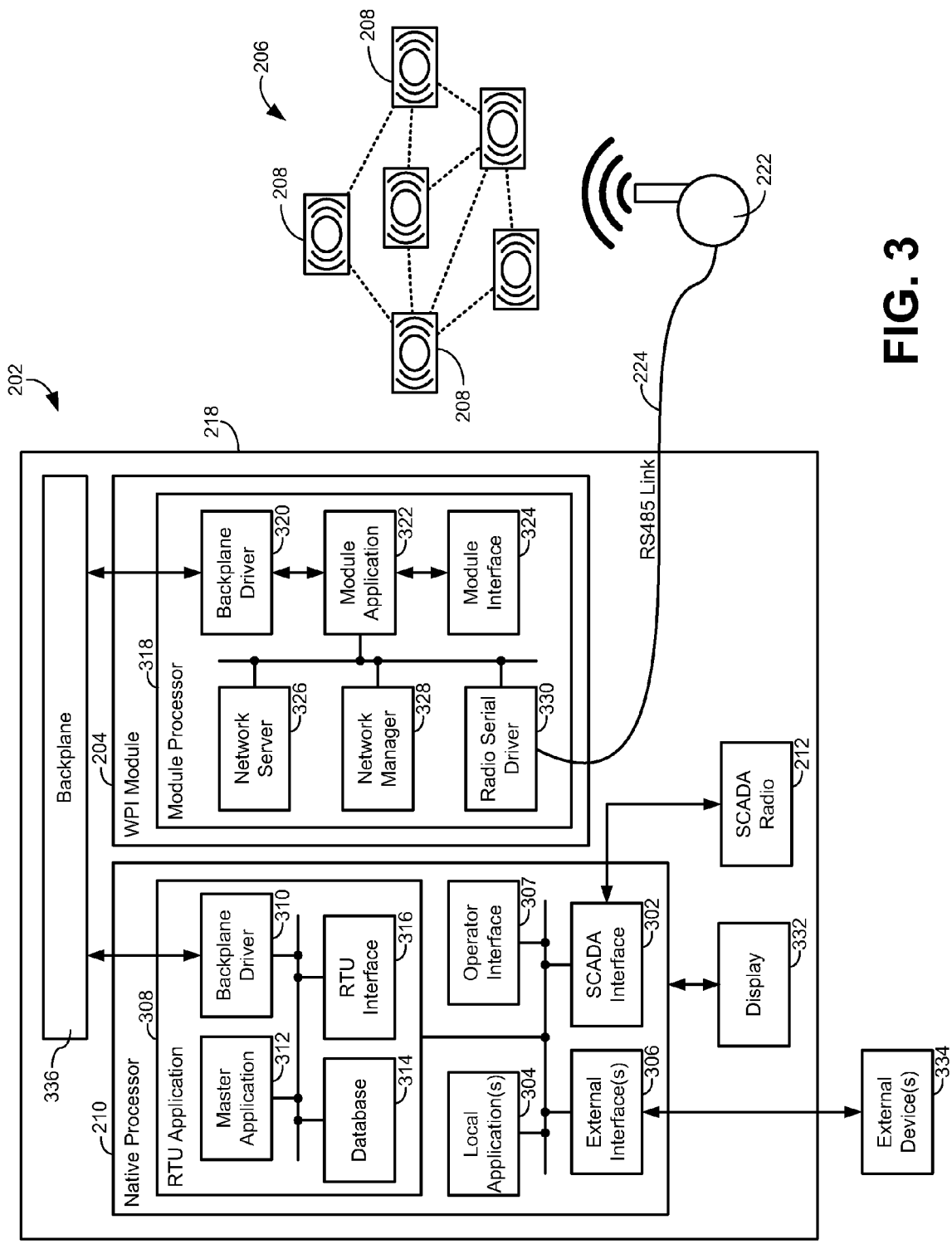
FIG. 3 illustrates an example manner of implementing the example system of FIG. 2.

FIG. 3 illustrates an example manner of implementing the example flow computer 202 of FIG. 2. As described above in connection with FIG. 2, the example flow computer 202 of FIG. 3 includes the example native processor 210 and the WPI module 204. The native processor 210 executes coded instructions associated with, among other things, a SCADA interface 302, local application(s) 304, one or more external interface(s) 306, an operator interface 307, and a remote terminal unit (RTU) application 308. The RTU application 308 may include multiple components including, a backplane driver 310, a master application 312, a database 314, and an RTU interface 316. The WPI module 204 contains a module processor 318 that may be any type of processing unit (e.g., a processor core, a processor, and/or a microcontroller) to execute coded instructions associated with, among other things, a backplane driver 320, a module application 322, a module interface 324, a network (e.g., HART) server 326, a network manager 328, and a radio serial driver 330.

To allow operators to interact with the example native processor 210 of the flow computer 202 and/or the module processor 318, the example flow computer 202 includes any type of display 332. In some examples, the example display 332 may be a local display incorporated into the flow computer 202, as shown in FIG. 3. In other examples, the display 332 may be on external device(s) 334 that interface with the flow computer 202 via the external interface(s) 306 to provide inputs to and/or receive outputs from the flow computer 202. Example displays 332 include, but are not limited to, a computer monitor, a computer screen, a television, a mobile device (e.g., a smart phone, a Blackberry™ and/or an iPhone™), etc., capable of displaying user interfaces (e.g., the operator interface 307) and/or applications implemented by the native processor 210 and/or the module processor 318.

Additionally or alternatively, operators may interact with the flow computer 202 remotely through other components in a SCADA system by transmitting data to and from the flow computer 202 via the long haul radio 212. Accordingly, the native processor 210 includes a SCADA interface 302 to enable such communications according to methods known in the art.

The example local application(s) 304 executed by the native processor 210 of the flow computer 202 of FIG. 3 include typical flow computer applications providing the core functionality of a flow computer. For example, the local application(s) 304 may monitor data from various field devices in a corresponding system (e.g., the field devices 208), perform flow calculations based on the data received, optimize production of the system, process the data through control algorithms, prepare data to be transmitted to other components in a SCADA system, and/or create historical archives of the system the flow computer 202 is monitoring.

The example flow computer 202 of FIG. 3 is capable of performing the stated tasks with respect to wireless field devices 208 by interfacing with the WPI module 204 via the RTU application 308, and the WPI module 204, in turn, interfaces with the field devices 208 via the network radio 222. In some examples, both the native processor 210 of the flow computer 202 and the module processor 318 of the WPI module 204 are in communication with a backplane 336 within the flow computer 202. As such, both processors 210, 318 in the example flow computer 202 of FIG. 3 include corresponding backplane drivers 310, 320 to manage both ends of a data bus implemented according to any suitable high speed communications protocol (e.g., universal serial bus (USB), Ethernet, serial, synchronous serial, etc.). In configuring the backplane 336 of the example flow computer 202 of FIG. 3, the native processor 210 is the master that may issue requests to the WPI module 204, which is the slave.

In operation, requests to be sent to the WPI module 204 may originate from any of a SCADA host system or other SCADA system components via the SCADA interface 302, external device(s) 334 that communicate with the flow computer 202 via the external interface(s) 306, or the operator interface rendered via the local display 332. Furthermore, requests may originate from the local application(s) 304 executed by the native processor 210. In some examples, the requests originating from any of these sources may communicate the requests to the RTU application 308 via the RTU interface 316. In some examples, the external devices 334 may communicate directly with the RTU application 308 via the RTU interface 316 rather than via the external interface(s) 306. As the RTU interface 316 receives the requests, the RTU interface 316 may forward the requests to the database 314 where the requests are stored. In some examples, the RTU interface 316 comprises a configuration interface that interacts with the database 314 to enable any suitable configuration tool to provide operation configuration options. Additionally, the RTU interface 316 provides for the retrieval of real time or historical data associated with the network 206.

The database 314 of the illustrated example is in communication with the master application 312. The example master application 312 may scan the database 314 to discover any new requests, which the master application 312 provides to the backplane driver 310 to be transmitted to the WPI module 204, which serves as the slave to respond to the requests. In the example flow computer 202 of FIG. 3, the master application 312 contains a periodic update routine that enables the RTU application 308 to poll each of the I/O modules (e.g., the WPI module 204) associated with each of the I/O ports 216 of the flow computer 202 shown in FIG. 2. Thus, when the RTU application 308 polls the WPI module 204, the master application 312 sends any new requests to the WPI module 204, retrieves responses from the WPI module 204, validates the responses, and then stores the responses in the database 314. Accordingly, in addition to any specific requests, the master application 312 may use the periodic update routine to poll each wireless field device 208 in the network 206 to gather primary value updates. In some examples, this process may be repeated on approximately one second intervals. In this manner, request responses are obtained and may then be provided to an operator via the display 332, the external devices 334, and/or other components within the SCADA system. In some examples, the master application 312 may communicate directly with other applications such that requests are received and/or responses are returned without storing the information within the database 314. For example, an Asset Management System (AMS) executed via an external device 334 may request and gather device diagnostics and/or asset information from the network 206 directly via the master application 312 and bypassing the database 314. Additionally or alternatively, in some examples, applications may have direct access to the database 314 without going through the RTU interface 316 of the RTU application 308.

In addition to storing requests and response data collected based upon the requests, the database 314 of the example flow computer of FIG. 3 may also provide a structure for each field device 208 in the network 206, as well as for the overall system, to prepare a list of live devices and indicate whether the devices are commissioned or non-commissioned (i.e., whether the WPI module 204 has established a dedicated connection to poll data from a particular field device 208). As explained above, these structures in the example database 314 may be available to other applications either within the flow computer 202 (e.g., the local application(s) 304) or outside the flow computer 202 (e.g., a SCADA host system).

As already mentioned, the WPI module 204 sends and receives all communications to and from the native processor 210 of the flow computer 202 through the RTU application 308 via the backplane 336. In the illustrated example, the backplane driver 320 of the WPI module 204 initially receives any requests sent from the master application 312 and provides the requests to the module application 322. The example module application 322 of FIG. 3 may interpret the requests for subsequent use by converting the data in the requests to conform to the corresponding wireless communications protocol implemented by the wireless field devices 208 (e.g., WirelessHART™). The example module application 322 also acts as a client to the network server 326 by managing and providing communications (e.g., the requests) to the network server 326. The network server 326 interprets the addresses and commands, prepared by the module application 322 according to the corresponding wireless communications protocol of the network 206, and communicates the address data and command data to the network manager 328. The address data provided by the module application 322 may be for the network server 326, the network radio 222, or any field device 208 that is connected to the network 206. With the address and command data available, the network manager 328 controls the timing of communications across the network 206 and contains a network meshing algorithm to ensure the delivery and retrieval of data from the appropriate source. In particular, all communications are transmitted to the network 206 via the network radio 222. Accordingly, the WPI module 204 also includes the radio serial driver 330 to control the physical layer (e.g., the RS485 Link 224) implementing the communications protocol that carries signals to and from the network radio 222. However, in some examples, the network radio 222 may be incorporated within the housing 218 of the example flow computer 202. In such examples, the WPI module 204 may include a receptacle for a coaxial cable to connect the network radio 222. In yet other examples, the network radio 222 is integrated within the WPI module 204, such that the coaxial cable connects the WPI module 204 directly to an antenna on the housing 218 whereby data is transmitted to and received from the field devices 208 of the wireless network 206.

Once response data based on a request has been retrieved from a field device 208, the response data is returned to the module application 322 via the reverse path through which the request was sent (e.g., from the network radio 222 and through the radio serial driver 330, the network manager 328, and the network server 326). The module application 322 performs error checking and/or system diagnostics based on the data retrieved in response to the requests. The module application 322 also prepares the response data by converting the response data to conform to the high speed communications protocol implemented on the backplane 336 and then providing the prepared response data to the backplane driver 320 to be transmitted to the RTU application 308 as described above.

In addition to acting on requests received via the RTU application 308, the module application 322 also performs various internal tasks associated with the wireless devices 208, even without receiving a particular request. By performing these internal tasks, the module application 322 may gather relevant information that may be sought in a future request via the RTU application 308. In this manner, the overall efficiency of the example flow computer 202 is increased as the response time for requests is reduced. For example, the module application 322 may request a list of the field devices 208 from the network server 326 that may subsequently be stored in the list of devices 208 of the database 314 described above. In some examples, the module application 322 may also gather information relevant to the field devices 208 to be stored in the database 314 including user defined tags, serial numbers, process value configurations (e.g., units), etc. In some examples, the module application 322 may trigger a network reconfiguration based on a user's definition of the network. Additionally, the module application 302 may monitor the availability of the field devices 208 to increase response time for requests. Furthermore, when the module application 322 identifies a "lost" field device 208 (e.g., a connection failure), the module application 322 may automatically prepare a fail response that can be provided when a request is received corresponding to the "lost" filed device 208.

Additionally or alternatively, the module application 322 may service requests received directly into the WPI module 204 via the example module interface 324 of FIG. 3. In some examples, the module interface 324 may correspond with and control a universal serial bus (USB) port on the WPI module 204. In this manner, the example module interface 324 provides a dedicated high bandwidth interface to enable program and/or application updates to the contents of the WPI module 204 and/or the retrieval of diagnostic logs. The module interface 324 may also provide requests for data from the field devices 208 of the network 206 in a similar manner as described above for requests sent via the RTU application 308.

While an example manner of implementing the example flow computer 202 of FIG. 2 has been illustrated in FIG. 3, the data structures, elements, processes and devices illustrated in FIG. 3 may be combined, divided, re-arranged, omitted, eliminated and/or implemented in any other suitable manner. Further, the example SCADA interface 302, the example local application(s) 304, the one or more example external interface(s) 306, the example operator interface 307, the example RTU application 308, the example backplane driver 310, the example master application 312, the example database 314, the example RTU interface 316, the example backplane driver 320, the example module application 322, the example module interface 324, the example network server 326, the example network manager 328, the example radio serial driver 330, and/or, more generally, the example flow computer 202 of FIG. 3 may be implemented by hardware, software, firmware and/or any combination of hardware, software and/or firmware. Further still, the example flow computer 202 may include additional elements, processes and/or devices instead of, or in addition to, those illustrated in FIG. 3, and/or may include more than one of any or all of the illustrated data structures, elements, processes and/or devices.

Figure 4:
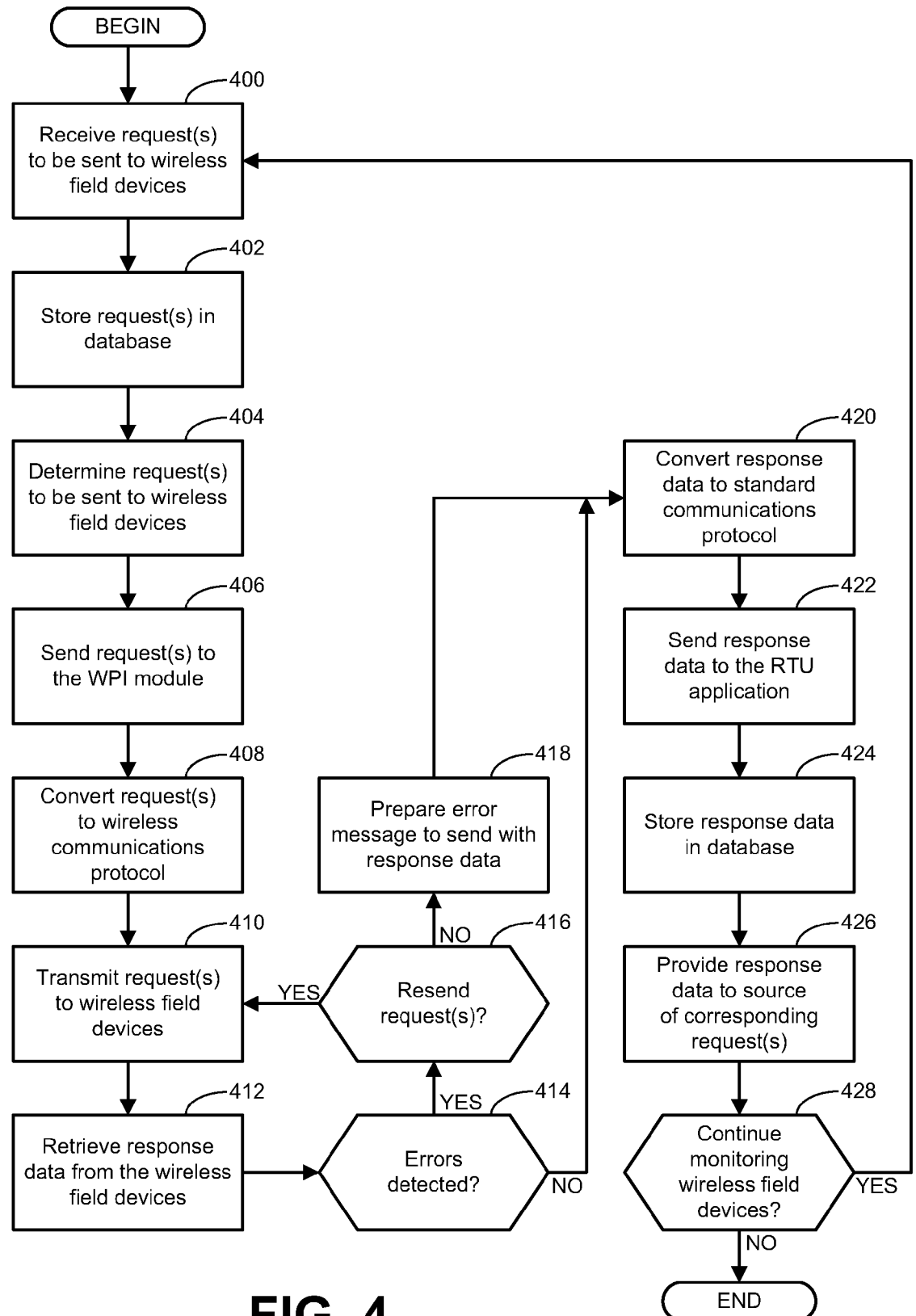
FIG. 4 is a flowchart representative of an example process that may be carried out to implement the example flow computer of FIG. 3, and/or, more generally, the example system of FIG. 2.

FIG. 4 is a flowchart representative of an example process that may be carried out to implement the example flow computer 202 of FIG. 3, and/or, more generally, the example system 200 of FIG. 2. More particularly, the example process of FIG. 4 may be representative of machine readable instructions that comprise a program for execution by a processor such as the processor 512 shown in the example processor platform 500 discussed below in connection with FIG. 5. The program may be embodied in software stored on a tangible computer readable medium such as a CD-ROM, a floppy disk, a hard drive, a digital versatile disk (DVD), a BluRay disk, or a memory associated with the processor 512. Alternatively, some or all of the example process of FIG. 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the example operations of FIG. 4 may be implemented manually or as any combination(s) of any of the foregoing techniques, for example, any combination of firmware, software, discrete logic and/or hardware. Further, although the example process is described primarily with reference to the example flow computer 202 of FIG. 3, many other methods of implementing the example process of FIG. 4 may alternatively be used. For example, the order of execution of the blocks may be changed, and/or some of the blocks described may be changed, eliminated, or combined. Additionally, any or all of the example process of FIG. 4 may be performed sequentially and/or in parallel by, for example, separate processing threads, processors, devices, discrete logic, circuits, etc.

As mentioned above, the example process of FIG. 4 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example process of FIG. 4 begins at block 400 where an RTU application (e.g., 308) of a flow computer (e.g., 202) receives request(s) to be sent to wireless field devices (e.g., 208) in a network (e.g., 206). In some examples, the network (e.g., 206) is configured according to the WirelessHART™ communications protocol. However, the example process of FIG. 4 may be implemented according to any suitable wireless communications protocol. The request(s) may correspond to any of calibration, diagnostics, data acquisition, control, asset management, or process optimization of the device (e.g., 208) situated in a corresponding control system. Further, the request(s) may originate from any of local application(s) (e.g., 304), another component of a SCADA system, or any other external device (e.g., 334). The request(s) received by the RTU application (e.g., 308) are then stored in a database (e.g., 314) (block 402).

A master application (e.g., 312) of the RTU application (e.g., 308) then determines the request(s) to be communicated to corresponding field devices (e.g., 208) (block 404). To determine such request(s), the master application (e.g., 312) scans the database (e.g., 314), which is set to trigger the master application (e.g., 312) regarding the request(s) to be sent. Additionally, the master application (e.g., 312) also contains a periodic update routine to poll every wireless device (e.g., 208) in the network (e.g., 206) at set intervals. Accordingly, the master application (e.g., 312) may also generate appropriate request(s) to implement the update routine. Once all the request(s) to be sent have been identified, the master application (e.g., 312) sends the request(s) to a wireless protocol interface (WPI) module (e.g., 204) (block 406). The request(s) are sent via a backplane (e.g., 336) communicatively coupled to both the WPI module (e.g., 204) and a native processor (e.g., 210) of the flow computer (e.g., 202) executing the RTU application (e.g., 308).

Once the request(s) are transmitted to the WPI module (e.g., 204), a module application (e.g., 322) converts the request(s) to comply with the wireless communications protocol implemented by the field devices (e.g., 208) (block 408). In some examples, the WPI module (e.g., 204) may receive request(s) directly via a module interface (e.g., 324), instead of via the RTU application (e.g., 308) according to the example process outlined above. In such examples, the WPI module (e.g. 204) similarly translates the request(s) to conform to the corresponding wireless communications protocol (block 408). In particular, the conversion process includes the module application (e.g., 322) preparing address and command data based on the protocol. The converted request(s) are then transmitted to the appropriate wireless field devices (e.g., 208) (block 410). The transmission of the request(s) is accomplished as the module application (e.g., 322) provides the address and command data of the translated request(s) to a network server (e.g., 326) implemented according to the wireless communications protocol. The network server (e.g., 326) communicates the request information to a network manager (e.g., 328) that controls the communications to the various wireless field devices (e.g., 208) in the network (e.g., 206) via a radio transmitter (e.g., 222) so that each request is received by its intended recipient wireless field device (e.g., 208). Once the request(s) are transmitted to the field devices (e.g. 208), response data is retrieved through the reverse process (block 412). That is, the wireless devices (e.g., 208) communicate the response data based on the request(s) back to the WPI module (e.g., 204) via a radio receiver (e.g., 222). The network manager (e.g., 328) controls the timing and communications of the devices (e.g., 208). The response data is provided to the network server (e.g., 326) and the response data is served to the module application (e.g., 322). In some examples, the module application (e.g., 322) may retrieve data from the field devices (e.g., 208) without first receiving a request from the RTU application (e.g., 308) as described above in connection with FIG. 3. In such examples, when the request(s) are sent to the WPI module (e.g., 204) at block 406, the module application (e.g., 322) may already have collected response data associated with one or more of the request(s). Accordingly, the module application (e.g., 322) may already be prepared to send the response data back to the RTU application (e.g., 308) as will be described in more detail below.

Having received the response data, the module application (e.g., 322) determines whether there are errors in the response data by performing error checking on the response data (block 414). If the module application (e.g., 322) detects an error, the module application (e.g., 322) determines whether the corresponding request should be resent (block 416). If the error is such that resending the request is appropriate, the example process returns to block 410 to again transmit the request. If the error is such that a second request is not beneficial, the module application (e.g., 322) prepares an error message corresponding to the response data (block 418). At this point in the example process of FIG. 4, the module application (e.g., 322) converts the response data (and any corresponding error message) to conform to the standard high speed communications protocol implemented by the backplane (e.g., 336) (block 420). Similarly, where the module application determines that the response data does not contain any error message (block 416), the process advances directly to block 420 to convert the response data as stated above.

With the response data appropriately translated, the module application sends the response data to the RTU application (e.g., 308) of the flow computer (e.g., 202) (block 422). The response data is transmitted over the backplane (e.g., 336) via the backplane drivers (e.g., 310, 320) and received by the master application (e.g., 312), where the response data may be validated. The master application (e.g., 312) then provides the response data to the database (e.g., 314) of the RTU application (e.g., 308) to be stored (block 424). The RTU application (e.g., 308) may then provide the response data to the source of the corresponding request(s) including any of the local application(s) (e.g., 304), external device(s) (e.g., 334), or other components in the SCADA system (block 426). In some examples, the RTU application (e.g., 308) may provide the response data to any of the applications or devices without first storing the response data in the database (e.g., 314). Additionally, where the requests originated via the module interface (e.g., 324), the module application (e.g., 322) may provide the response data to the module interface (e.g., 324) rather than sending it to the RTU application (e.g., 312). The example process of FIG. 4 then determines whether the flow computer (e.g., 202) is to continue monitoring the wireless devices (e.g., 208) of the network (e.g., 206) (block 428). If so, the process returns to block 400 to receive new request(s) and repeat the example process. If the flow computer (e.g., 202) is not to continue monitoring the wireless field devices (e.g., 208), the process ends.

Figure 5:
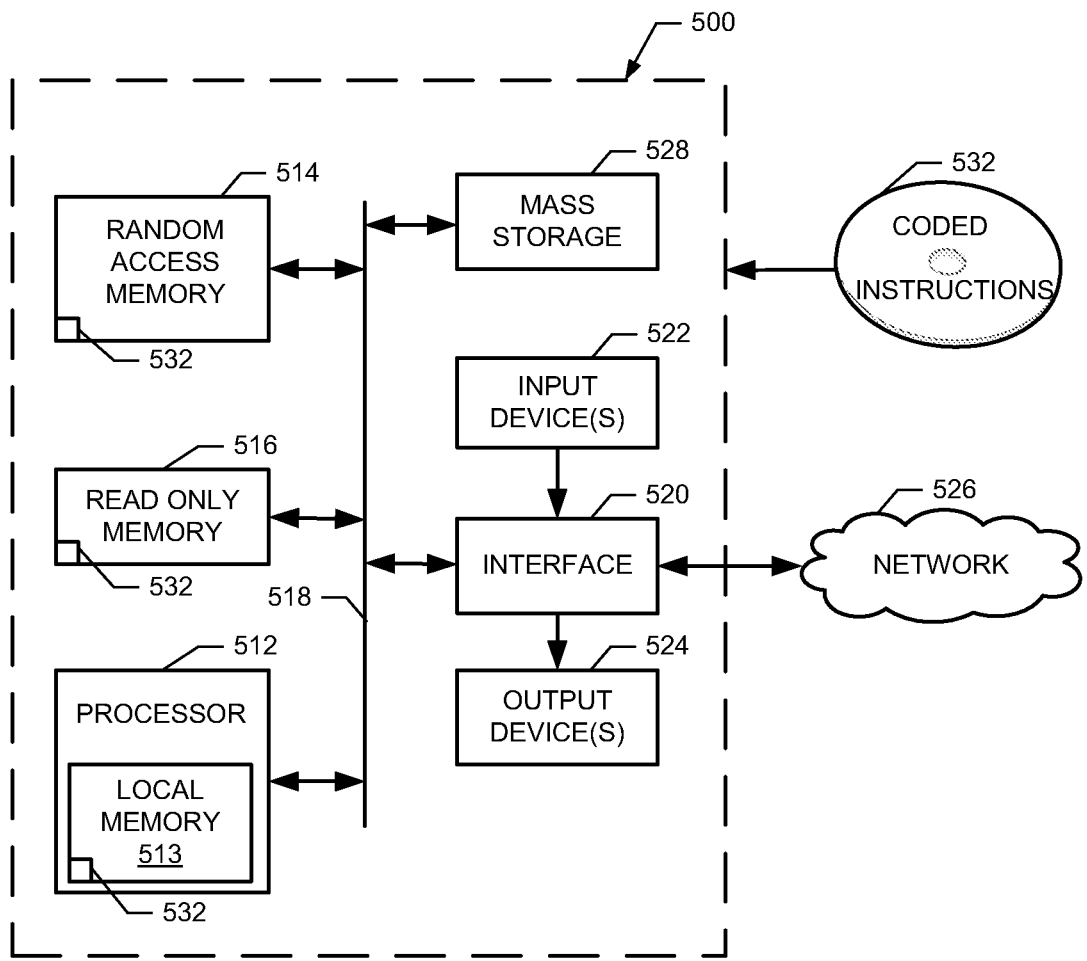
FIG. 5 is a schematic illustration of an example processor platform that may be used and/or programmed to execute the example process of FIG. 4 to implement the example flow computer of FIG. 3, and/or, more generally, the example system of FIG. 2.

FIG. 5 is a schematic illustration of an example processor platform 500 that may be used and/or programmed to carry out the example process of FIG. 4 to implement the example flow computer 202 of FIG. 3, and/or, more generally, the example system 200 of FIG. 2. The platform 500 of the instant example includes a processor 512. For example, the processor 512 can be implemented by one or more microprocessors or controllers from any desired family or manufacturer.

The processor 512 includes a local memory 513 (e.g., a cache) and is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514 and 516 is controlled by a memory controller.

The processor platform 500 also includes an interface circuit 520. The interface circuit 520 may be implemented by any type of interface standard, such as an Ethernet interface, a universal serial bus (USB), and/or a PCI express interface. One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system. One or more output devices 524 are also connected to the interface circuit 520. The output devices 524 can be implemented, for example, by display devices (e.g., a liquid crystal display, a cathode ray tube display (CRT), a printer and/or speakers). The interface circuit 520, thus, typically includes a graphics driver card.

The interface circuit 520 also includes a communication device such as a modem or network interface card to facilitate exchange of data with external computers via a network 526 (e.g., an Ethernet connection, a digital subscriber line (DSL), a telephone line, coaxial cable, a cellular telephone system, etc.).

The processor platform 500 also includes one or more mass storage devices 528 for storing software and data. Examples of such mass storage devices 528 include floppy disk drives, hard drive disks, compact disk drives and digital versatile disk (DVD) drives.

Coded instructions 532 to implement the example process of FIG. 4 may be stored in the mass storage device 528, in the volatile memory 514, in the non-volatile memory 516, and/or on a removable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A method, comprising:
receiving a request to be sent to a wireless device in a network of wireless devices, the request to be received via a remote terminal unit application executed on a processor within a flow computer;
communicating the request to the wireless device via a communications interface module, the communications interface module to be communicatively coupled to the processor via a backplane contained within a housing of the flow computer, the backplane to provide communications according to a high speed data bus communications protocol;
preparing, via the communications interface module, request information corresponding to the request according to a wireless communication protocol implemented by the network of wireless devices, the request information to contain address data and command data;
providing the address and command data to a server application within the communications interface module, the server application to interpret the address data and the command data and communicate the request information to a network manager within the communications interface module; and
transmitting the request information to the wireless device, wherein the network manager controls a timing of the transmitting.

2. The method described in claim 1, wherein the request is received from at least one of a local application executed via the processor within the flow computer, an external application in communication with the flow computer, an external component in communication with the flow computer, or an operator via an operator interface of the flow computer.

3. The method described in claim 1, further comprising storing the request in a database associated with the remote terminal unit application.

4. The method described in claim 1, further comprising:
retrieving response data from the wireless device, the response data based on the request; and
storing the response data in a database associated with the remote terminal unit application.

5. The method described in claim 4, further comprising retrieving the response data by:
collecting the response data via a receiver;
preparing, via the communications interface module, the response data to be communicated to the remote terminal unit application via the backplane according to the high speed data bus communications protocol; and sending the response data to the remote terminal unit application via the backplane.

6. The method described in claim 4, wherein the response data includes at least one of measurement data, diagnostics data, calibration data, or asset management data.

7. The method described in claim 1, wherein transmitting the request information comprises transmitting via a transmitter contained within the housing of the flow computer.

8. The method described in claim 1, wherein transmitting the request information comprises transmitting via a transmitter in communication with the flow computer via a cable configured according to the wireless communication protocol.

9. The method described in claim 1, further comprising at least one of receiving requests via a dedicated interface port in the communications interface module, installing updated applications via the dedicated interface port, or retrieving diagnostic logs via the dedicated interface port.

10. The method described in claim 1, further comprising generating a live list of the devices that are commissioned or non-commissioned within a supervisory control and data acquisition system.

11. The method described in claim 1, wherein the processor and the communications interface module are accessible via an operator interface on the flow computer.

12. An apparatus, comprising:
a communications interface module to communicate with a network of one or more wireless devices according to a wireless communications protocol, the wireless devices corresponding to field devices in a supervisory control and data acquisition system, wherein the communications interface module has a module processor to execute:
a module application to receive requests from a remote terminal unit application and return response data via a backplane, the module application to convert the requests from a high speed data bus communications protocol to the wireless communications protocol and to convert the response data from the wireless communications protocol to the high speed data bus communications protocol;
a network manager to control timing of communications to the devices in the network; and
a server to interpret addresses and commands from the module application and to communicate the addresses and commands to the network manager;
a local processor of a flow computer associated with the supervisory control and data acquisition system to execute the remote terminal unit application, the local processor separate from the communications interface module, the remote terminal unit application to communicate with the devices in the network via the communications interface module; and
wherein the backplane is within the flow computer to communicatively couple the remote terminal unit application and the communications interface module according to the high speed data bus communications protocol.

13. The apparatus described in claim 12, further comprising a housing, the housing to contain the communications interface module, the local processor, and the backplane.

14. The apparatus described in claim 12, wherein the local processor and the communications interface module of the flow computer are to be powered via a solar power system.

15. The apparatus described in claim 12, wherein the module application is to at least one of retrieve the response data from the devices in the network, perform error checking, or perform system diagnostics.

16. The apparatus described in claim 12, wherein the communications interface module further comprises a universal serial bus port to at least one of enable high bandwidth application updates, enable high bandwidth retrieval of diagnostic logs, provide ones of the requests to be sent to the devices via the module application, or retrieve the response data via the module application.

17. The apparatus described in claim 12, wherein the remote terminal unit application comprises:
a remote terminal unit interface to interact with at least one of local applications on the local processor or external applications or components of the supervisory control and data acquisition system;
a database to store requests to be communicated to the devices in the network, to store response data provided by the devices based on the requests, and to provide the response data to the remote terminal unit interface; and
a master application to send the requests to the communications interface module via the backplane, to receive the response data from the communications interface module via the backplane, to validate the response data, and to send the response data to the database for storage.

18. A tangible article of manufacture storing machine readable instructions, which when executed, cause a machine to at least:
receive a request to be sent to a wireless device in a network of wireless devices, the request to be received by a remote terminal unit application executed on a processor within a flow computer; and
communicate the request to the wireless device via a communications interface module, the communications interface module to be communicatively coupled to the processor via a backplane contained within a housing of the flow computer, the backplane to provide communications according to a high speed data bus communications protocol, wherein the request is communicated by preparing, via the communications interface module, request information corresponding to the request according to a wireless communication protocol implemented by the network of wireless devices, the request information to contain address data and command data, wherein the request is communicated by:
providing the address and command data to a server application within the communications interface module, the server application to interpret the address data and the command data and communicate the request information to a network manager within the communications interface module; and
transmitting the request information to the wireless device, wherein the network manager controls a timing of the transmitting.

19. The tangible article of manufacture as described in claim 18, wherein the instructions further cause the machine to:
retrieve response data from the wireless device, the response data based on the request; and
store at least one of the request or the response data in a database associated with the remote terminal unit application.

20. The tangible article of manufacture as described in claim 19, wherein the instructions further cause the machine to retrieve the response data by:
collecting the response data;

preparing, via the communications interface module, the response data to be communicated to the remote terminal unit application via the backplane according to the high speed data bus communications protocol; and sending the response data to the remote terminal unit application via the backplane.

21. The tangible article of manufacture as described in claim 18, wherein the instructions further cause the machine to generate a live list of the wireless devices that are commissioned or non-commissioned within a supervisory control and data acquisition system.

* * * * *